United States Patent [19]
Furuta et al.

[11] Patent Number: 5,519,813
[45] Date of Patent: *May 21, 1996

[54] NEURON UNIT FOR PROCESSING DIGITAL INFORMATION

[75] Inventors: Toshiyuki Furuta; Hirotoshi Eguchi, both of Yokohama, Japan

[73] Assignee: Ricoh Company, Ltd., Tokyo, Japan

[*] Notice: The term of this patent shall not extend beyond the expiration date of Pat. No. 5,274,747.

[21] Appl. No.: 120,535

[22] Filed: Sep. 14, 1993

Related U.S. Application Data

[63] Continuation of Ser. No. 794,023, Nov. 19, 1991, Pat. No. 5,274,747.

[30] Foreign Application Priority Data

| Nov. 20, 1990 | [JP] | Japan | 2-316505 |
| Nov. 20, 1990 | [JP] | Japan | 2-316506 |
| Oct. 28, 1991 | [JP] | Japan | 3-281244 |

[51] Int. Cl.$^6$ ................................ G06F 15/18
[52] U.S. Cl. ............................................ 395/27
[58] Field of Search ............................ 395/27, 24

[56] References Cited

U.S. PATENT DOCUMENTS

| 3,293,609 | 12/1966 | Martin | 395/27 |
| 4,396,301 | 8/1983 | Stucki | 364/557 |
| 4,737,929 | 4/1988 | Denker | 364/807 |
| 4,893,255 | 1/1990 | Tomlinson, Jr. | 395/24 |
| 5,052,043 | 9/1991 | Gaborski | 395/23 |
| 5,059,814 | 10/1991 | Mead et al. | 395/24 |
| 5,131,073 | 7/1992 | Furuta et al. | 395/27 |

OTHER PUBLICATIONS

K. Fukushima, "Multiple–Layer Circuit Having Self–Organizing Function . . . Cognitron", National Conv. Rec. S9–7, *Inst. of Elec. and Comm. Engineers* (1974), pp. 250–251.
T. Yoshida et al., "Neuron Coupling Model", National Conv. Rec. S9–7, *Inst. of Elec. and Comm. Engineers* (1974), pp. 248–249.
K. Kamada et al., "Digital Neuron Model", Spring National Conv. Rec. D–3, *Inst. of Elec. and Comm. Engineers* (1988), pp. 2–3.
A. F. Murray et al., "A Novel Computational and Signalling Method for VLSI Neural Networks" *Thirteenth European Solid–State Cir. Conf.* (Sep. 1987), pp. 19–22.
A. F. Murray, "Asynchronous Arthmetic for VLSI Neural System", *Electronics Letters,* vol. 23, No. 12, (Jan. 1987), pp. 642–643.
T. Ito et al., "A Neural Network Model Extracting Features from Speech Signals", *Trans. Inst. Elec., Info. and Comm. Engineers,* vol. J70–D, No. 2 (Feb. 1987), pp. 451–461.
Mano, *Computer System Architecture*, Second Ed., Prentice Hall (1982), pp. IX, 3–4, 6, 13, 14, 59–61, 126–136.
W. Banzhaf, "On a Simple Stochastic Neuron–Like Unit", *Biological Cybernetics,* vol. 60, No. 2, (1988), pp. 153–160.
K. Fukushima, "Improvement In Pattern–Selectivity of a Cognitron", *Trans. Inst. Elec. and Comm. Engineers,* vol. J62–A, No. 10, pp. 650–657.

*Primary Examiner*—Robert W. Downs
*Attorney, Agent, or Firm*—Oblon, Spivak, McClelland, Maier & Neustadt

[57] ABSTRACT

A neuron unit includes first shift registers for storing first weighting coefficients; second shift registers for storing second weighting coefficients; a first gate circuit for obtaining first logical products of first binary input signals and the first weighting coefficients; a second gate circuit for obtaining second logical products of second binary input signals and the second weighting coefficients; a third gate circuit for obtaining a logical sum of the first logical products, and for outputting a first binary response signal corresponding to the logical sum; a fourth gate circuit for obtaining a logical sum of the second logical products, and for outputting a second binary response signal corresponding to the logical sum; a signal generator for outputting a binary signal; and an output circuit for outputting a binary output signal, the first binary response signal being used as the binary output signal when values of the first and second binary response signals differ from each other, and the binary signal output from the signal generator being used as the binary output signal when values of the first and second binary response signals are equal to each other.

4 Claims, 10 Drawing Sheets

FIG. 1A PRIOR ART
FIG. 1B PRIOR ART
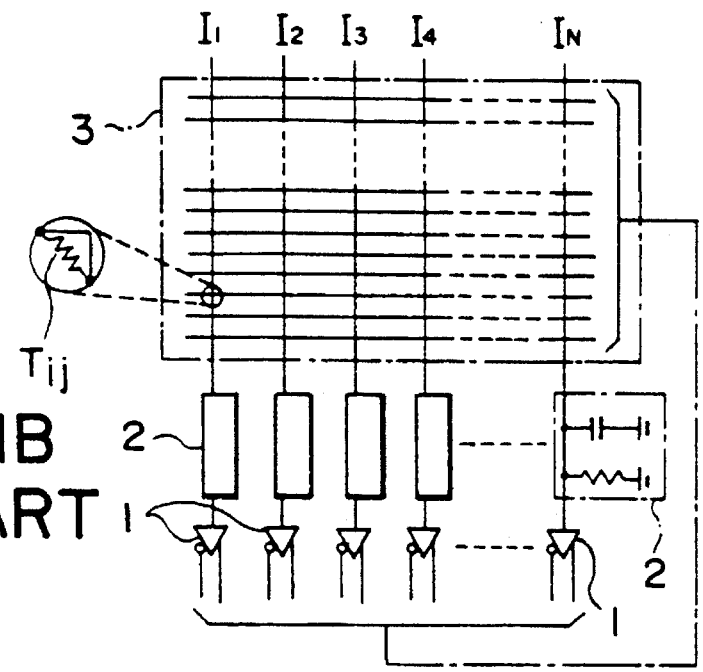
FIG. 2A PRIOR ART
FIG. 2B PRIOR ART
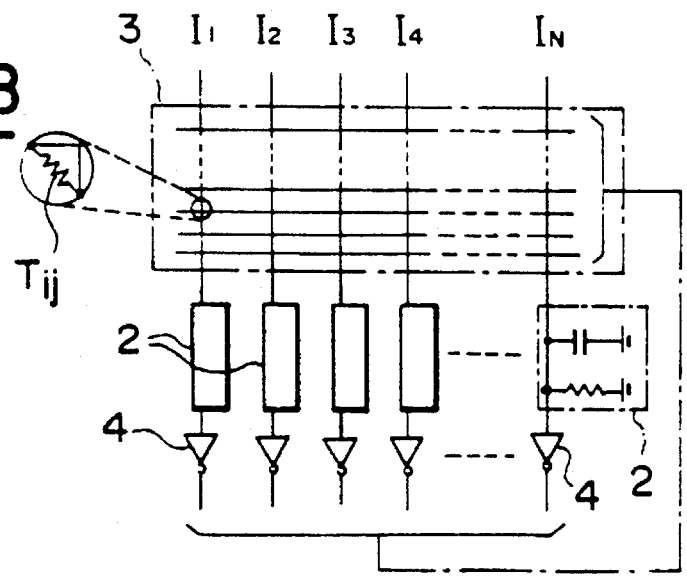

FIG. 4A   INPUT SIGNAL $y_l$   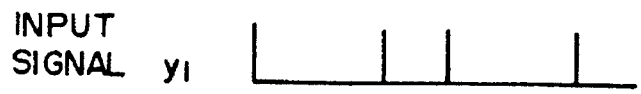   = 4/6
FIG. 4B   SYNCH. SIGNAL CK   
FIG. 5A   WEIGHTING COEFF. $T_{ij}$      = 3/6
FIG. 5B   SYNCH. SIGNAL CK   
FIG. 6A   INPUT SIGNAL $y_i$      = 4/6
FIG. 6B   WEIGHTING COEFF. $T_{ij}$      = 3/6
FIG. 6C   $y_l \cap T_{ij}$      = 2/6

NEURON UNIT FOR PROCESSING DIGITAL INFORMATION

This is a continuation of application Ser. No. 07/794,023, filed on Nov. 19, 1991, now U.S. Pat. No. 5,274,747.

BACKGROUND OF THE INVENTION (1) Field of the Invention

The present invention generally relates to a neuron unit, and more particularly to a neuron unit which is modeled on a nervous cell and applied to neural computers.

(2) Description of Related Art

A neural network has been proposed which carries out a parallel processing of information. The neural network is modeled on functions of nervous cells which are units for processing information in a living human body, so that the neural network includes neuron units modeled on the nervous cells and connected to each other to form a network. It is relatively difficult for conventional Neumann computers to carry out a character recognition, an associative storage, a motion control and the like, while they are easily carried out in a living human body. The neural network is modeled on a nervous system in a living human body so that it is possible to realize parallel processing and a learning function which are characteristic of the nervous system in the living human body. Thus, the neural network can easily carry out character recognition, associative storage, motion control and the like. Functions in the neural network are, in general, realized by use of a computer simulation. However, it is preferable that the neural network be formed of hardware to perform parallel processing of the information.

Conventionally, Japanese Patent Laid Open Publication No.62-295188 discloses a neural network formed of hardware as shown in FIG. 1.

Referring to FIG. 1, a neural network includes a resistive feedback circuit network 3, CR circuits 2 connected to the resistive feedback circuit network 3 and amplifiers 1, each of which is connected to a corresponding one of the CR circuits 2. In this neural network, an intensity of coupling between the nervous cells is described by a resistance of a resistor $T_{ij}$ (a lattice point within the resistive feedback circuit network 3), and a nervous response function is described by an S-curve transfer function set in each of the amplifiers 1. The resistive feedback circuit network 3 feeds back an output of each of the amplifiers 1 to an input of each of the amplifiers 1 via a corresponding one of the CR circuits 2 as indicated by a one-dot chain line in FIG. 1. Input currents $I_1, I_2, \ldots, I_N$ are respectively applied to inputs of the amplifiers 1 via the CR circuits 2. In addition, the coupling between the nervous cells may be categorized as being either an excitation or an inhibition coupling, and such couplings are mathematically described by positive and negative signs of weighting coefficients. However, it is difficult to realize the positive and negative values by the circuit constants. Hence, the output of each of the amplifiers 1 is divided into two signals, and one of the two signals is inverted so as to generate a positive signal and a negative signal. An output of the neural network is derived from a collection of output voltages of the amplifiers 1.

FIG. 2 shows a modification of the neural network shown in FIG. 1. This modification is disclosed in the above Japanese Patent Laid Open Publication No.62-295188. In this case, the neural network is simplified based on a mathematical analysis. Negative gain amplifiers 4 each of which produces a single output are used in place of the amplifiers 1 shown in FIG. 1. The fundamental modification is similar to that of neural network shown in FIG. 1.

The conventional neural networks shown in FIGS. 1 and 2 are formed of analog circuits. In other words, the input and output quantities are described in current values or voltage values, and all operations within the circuits are carried out in analog form.

However, it is difficult to ensure accurate and stable operation of an analog circuit because the characteristics of the circuits forming the neural network change depending on the temperature, a drift occurs during an initial stage of the circuit operation when the power source is turned on, and the like. Particularly in the case of the neural network, at least several hundred amplifiers are required, and operation stability is critical since a non-linear operation is carried out.

In view of the above, a neural network formed of digital circuits is proposed by Hirai et al., in "Design of a Completely Digital Neuro-Chip", Technical Report of the Electronic Information and Communication Society, ICD88-130. But this digital neural network is simply an emulation of the conventional analog neural network, and the circuit construction of the digital neural network is quite complex in that up-down counters and the like are required.

To eliminate the above disadvantage of the conventional digital neural network, the applicant has proposed a digital neuron model in Japanese Patent Application No.1-179629. In this conventional digital neuron model, the relationship between the input and the output is fixedly determined. For example, when the input is "0", the output is always "0".

SUMMARY OF THE INVENTION

Accordingly, a general object of the present invention is to provide a novel and useful neuron unit in which the disadvantages of the aforementioned prior art are eliminated.

A more specific object of the present invention is to provide a neuron unit in which information can be processed at a high speed.

Another object of the present invention is to provide a neuron unit in which the processing ability can be improved.

The above objects of the present invention are achieved by a neuron unit for simultaneously processing a plurality of binary input signals and outputting an output signal which is indicative of a result of the processing, the neuron unit comprising: a plurality of first input lines for receiving first binary input signals; a plurality of second input lines for receiving second binary input signals; first storage means for storing first weighting coefficients formed of binary bit sequences; second storage means for storing second weighting coefficients formed on binary bit sequences; first gate means, coupled to the first input lines and the first storage means, for successively obtaining first logical products each of which is a logical product of each of the first binary input signals and a corresponding one of the first weighting coefficients read out from the first storage means; second gate means, coupled to the second input lines and the second storage means, for successively obtaining second logical products each of which is a logical product of each of the second binary input signals and a corresponding one of the second weighting coefficients read out from the second storage means; third gate means, coupled to the first gate means, for obtaining a logical sum of the first logical products obtained by the first gate means, and for outputting a first binary response signal corresponding to the logical sum; fourth gate means, coupled to the second gate means, for obtaining a logical sum of the second logical products obtained by the second gate means, and for outputting a second binary response signal corresponding to the logical sum; signal generating means for outputting a binary signal; and output means, coupled to the third gate means, the fourth gate means and the signal generating means, for outputting a binary output signal, the first binary response signal being used as the binary output signal when values of the first and second binary response signals differ from each other, and the binary signal output from the signal generating means being used as the binary output signal when values of the first and second binary response signals are equal to each other.

The above objects of the present invention are also achieved by a neuron unit for simultaneously processing a plurality of binary input signals and outputting an output signal which is indicative of a result of the processing, the neuron unit comprising: a plurality of input lines for receiving binary input signals; first storage means for storing weighting coefficients formed of binary bit sequences;

first gate means, coupled to the input lines and the first storage means, for successively obtaining logical products each of which is a logical product of each of the binary input signals and a corresponding one of the weighting coefficients read out from the first storage means; second gate means for obtaining a logical sum of inputs supplied thereto; third gate means for obtaining a logical sum of inputs supplied thereto; supply means, coupled to the first, second and third gate means, for selectively supplying the logical products obtained by the first gate means to either the second or third gate means in accordance with state data supplied from an external unit, the state data describing either a first state or a second state, the second gate means to which the logical products are supplied outputting a first binary response signal corresponding to the logical sum, and the third gate means to which the logical products are supplied outputting a second binary response signal corresponding to the logical sum; signal generating means for outputting a binary signal; and output means, coupled to the second gate means, the third gate means and the signal generating means, for outputting a binary output signal, the first binary response signal being used as the binary output signal when values of the first and second binary response signals differ from each other, and the binary signal output from the signal generating means being used as the binary output signal when values of the first and second binary response signals are equal to each other.

Further, the above objects of the present invention are also achieved by a neuron unit for simultaneously processing a plurality of binary input signals and outputting an output signal which is indicative of a result of the processing, the neuron unit comprising: a plurality of input lines for receiving binary input signals; first storage means for storing first weighting coefficients formed of binary bit sequences; second storage means for storing second weighting coefficients formed on binary bit sequences; first gate means, coupled to the input lines and the first storage means, for obtaining first logical products each of which is a logical product of each of the binary input signals and a corresponding one of the first weighting coefficients read out from the first storage means; second gate means, coupled to the input lines and the second storage means, for obtaining second logical products each of which is a logical product of each of the binary input signals and a corresponding one of the second weighting coefficients read out from the second storage means; third gate means, coupled to the first gate means, for obtaining a logical sum of the first logical products obtained by the first gate means, and for outputting a first binary response signal corresponding to the logical sum; fourth gate means, coupled to the second gate means, for obtaining a logical sum of the second logical products obtained by the second gate means, and for outputting a second binary response signal corresponding to the logical sum; signal generating means for outputting a binary signal; and output means, coupled to the third gate means, the fourth gate means and the signal generating means, for outputting a binary output signal, the first binary response signal being used as the binary output signal when values of the first and second binary response signals differ from each other, and the binary signal output from the signal generating means being used as the binary output signal when values of the first and second binary response signals are equal to each other.

According to the present invention, as digital information can be processed in the neuron unit, a process speed can be higher than that of the conventional unit. In addition, when a value of the first response signal corresponding to the excitation is equal to a value of the second response signal corresponding to the inhibition, another binary signal is output, as the binary output signal, from the neuron unit. That is, as the response function of the neuron unit can be changed by changing the binary output signal, the processing ability can also be improved.

Additional objects, features and advantages of the present invention will become apparent from the following detailed description when read in conjunction with the accompanying drawings.

BRIEF DESCRIPTION OF THE DRAWINGS

FIGS. 1 and 2 are diagrams illustrating conventional neural networks which are formed of hardware.

FIG. 4A, 4B, 5A, 5B, 6A, 6B, 6C, 7A and 7B are diagrams illustrating pulse sequences of an input signal, a weighting coefficient, logical products of the input signal and the weighting coefficient, and a logical sum of the logical products.

DESCRIPTION OF PREFERRED EMBODIMENTS

A description will now be given of the principle of the present invention.

Figure 3:
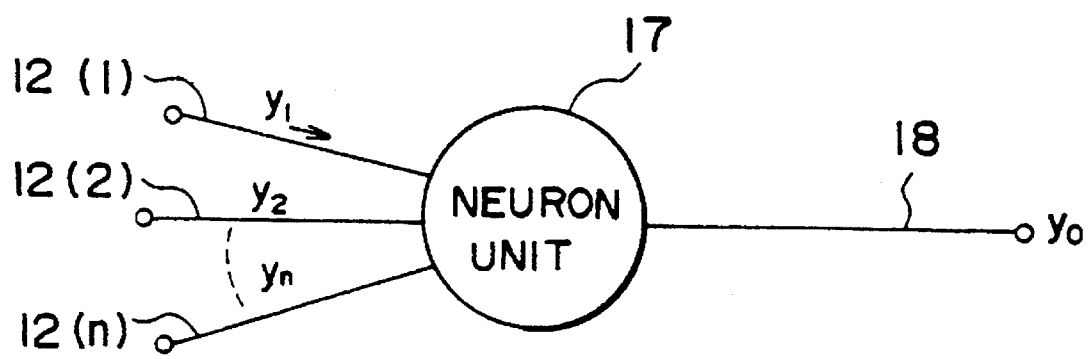
FIG. 3 is a diagram illustrating a basic construction of a neuron unit.

FIG. 3 shows a basic construction of a neuron unit which is modeled on a nervous cell. Referring to FIG. 3, a neuron unit 17 has a plurality of input lines 12(1), 12(2), . . . , and 12(n) and an output line 18. Each of the input lines 12(1), 12(2), ..., and 12(n) is coupled to another neuron unit (not shown). The neuron unit 17 outputs an output signal $y_o$ from the output line 18 when input signals $y_i$ (i=1,2, ..., and n) are supplied via the input lines 12(i) thereto. The neuron unit 17 generates the output signal $y_o$ in accordance with the following formulas (1) and (2).

$$u_j = \sum_i y_i T_{ij} \quad (1)$$

$$y_o = f(u_j) \quad (2)$$

where $u_j$ is an internal voltage which is generated in a j-th neuron unit, $T_{ij}$ is a weighting coefficient representing a degree of coupling between the j-th neuron unit and a neuron unit coupled to an i-th input line of the j-th neuron unit, and f is a nervous response function, such as a sigmoid function (S-curve transfer function).

Input and output signals, intermediate signals which are generated in the neuron unit, weighting coefficients, teacher signals and the like are described by binary pulse trains (binary bit sequences) which may have values "0" and "1". The above signals are processed in synchronism with each other in the neuron unit.

An intensity of an input signal $y_i$ input to the i-th input line 12(i) is described by a pulse density, that is, the number of "1"s in the pulse train within a predetermined time. FIGS. 4A and 4B respectively show the input signal $y_i$ and a synchronizing clock signal ck for a case where information "4/6" is described by the input signal $y_i$. In this case, there are four "1"s and two "0"s within a predetermined time amounting to six pulses of the synchronizing clock signal ck. It is preferable that the "1"s and "0"s of the input signal $y_i$ be arranged at random, as will be described later.

A weighting coefficient $T_{ij}$ is also described by the pulse density. The weighting coefficient $T_{ij}$ is prestored as a bit sequence of "0"s and "1"s in a memory provided in the j-th neuron unit. FIGS. 5A and 5B respectively show the weighting coefficient $T_{ij}$ and the synchronizing clock signal ck for a case where the value "3/6" is described by the weighting coefficient $T_{ij}$. In this case also, it is preferable that the "1"s and "0"s of the weighting coefficient $T_{ij}$ be arranged at random.

The binary bit sequence which corresponds to the weighting coefficient $T_{ij}$ is successively read out from the memory, then the logical products of the input signal $y_i$ and the weighting coefficient $T_{ij}$ are obtained ($y_i \cap T_{ij}$). In a case where a binary bit sequence "101101" corresponding to the input signal $y_i$, as shown in FIG. 4A, is supplied to the i-th input line 12 (i), the logical products of the binary bit sequence "101101" corresponding to the input signal $y_i$ and a binary bit sequence "101010" read out from the memory as the weighting coefficient $T_{ij}$, as shown in FIG. 5A, are obtained. As a result, a binary sequence "101000" corresponding to the logical products is obtained, as shown in FIGS. 6A, 6B and 6C. In this case, the input signal $y_i$ is converted by the weighting coefficient $T_{ij}$ into a signal having a pulse density of 2/6. The pulse density corresponding to the logical products of the input signal $y_i$ and the weighting coefficient $T_{ij}$ is approximately a product of the pulse density of the input signal $y_i$ and the pulse density of the weighting coefficient $T_{ij}$. That is, the calculation ($y_i \cdot T_{ij}$) in the formula (1) is carried out. The longer a binary bit sequence, and/or the more random the arrangement of "0"s and "1"s in the binary bit sequence, the closer the logical product is to a result of the mathematical product calculation.

Figure 7A:
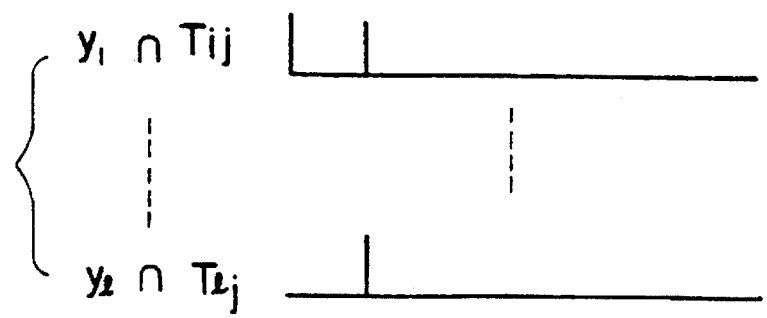
Figure 7B:

As the neuron unit has a plurality of input lines, a plurality of logical products of input signals and weighting coefficients are obtained in the neuron unit. A logical sum of the logical products is generated by an OR circuit. The input signals are supplied to the neuron unit in synchronism with each other, so that, in a case where a first logical product is a binary bit sequence "101000" and a second logical product is a binary bit sequence "010000", the logical sum is a binary bit sequence "111000". When a plurality of logical products are obtained, the logical sum is generated based on the logical products, as shown in FIG. 7A and 7B. In a case where the pulse density of each of the binary bit sequences is low, the pulse density of a binary bit sequence representing the logical sum of the binary bit sequences is approximately equal to a mathematical sum of the pulse densities of the binary bit sequences. The higher the pulse density of each of the binary bit sequences, the closer an output of the OR circuit is to a saturation state. Thus, in a case where the pulse density of each of the binary bit sequences is high, the pulse density of a binary bit sequence representing the logical sum of the binary bit sequences is not equal to a mathematical sum of the pulse densities of the binary bit sequences. That is, an input-output characteristic of the OR circuit is non-linear. The pulse density of the binary bit sequence is within a range of 1–0 and is represented by a monotonous increasing function. Thus, the input-output characteristic can be approximately the sigmoid function. As a result of this, the OR circuit can carry out a summation of the above formula (1) and the calculation in accordance with the above formula (2) simultaneously.

The nervous cells are coupled to each other under either an excitatory coupling condition or an inhibitory coupling condition, in general. In a calculation performed in the neuron unit, the excitatory coupling may be described by a positive weighting coefficient $T_{ij}$, and the inhibitory coupling may be described by a negative weighting coefficient $T_{ij}$. The neuron unit formed of the analog circuits supplies an inverted output of the amplifier to another neuron unit via the resistance corresponding to the weighting coefficient $T_{ij}$ under the inhibitory coupling condition.

On the other hand, in the neuron unit formed of the digital circuits according to the following embodiments, the excitatory coupling and the inhibitory coupling condition can be distinguished from each other as will be described later.

A description will now be given of a first embodiment of the present invention with reference to FIG. 8. In this first embodiment, a system for performing a process in accordance with the above formulas (1) and (2) is divided into an excitation group and an inhibition group.

Figure 8:
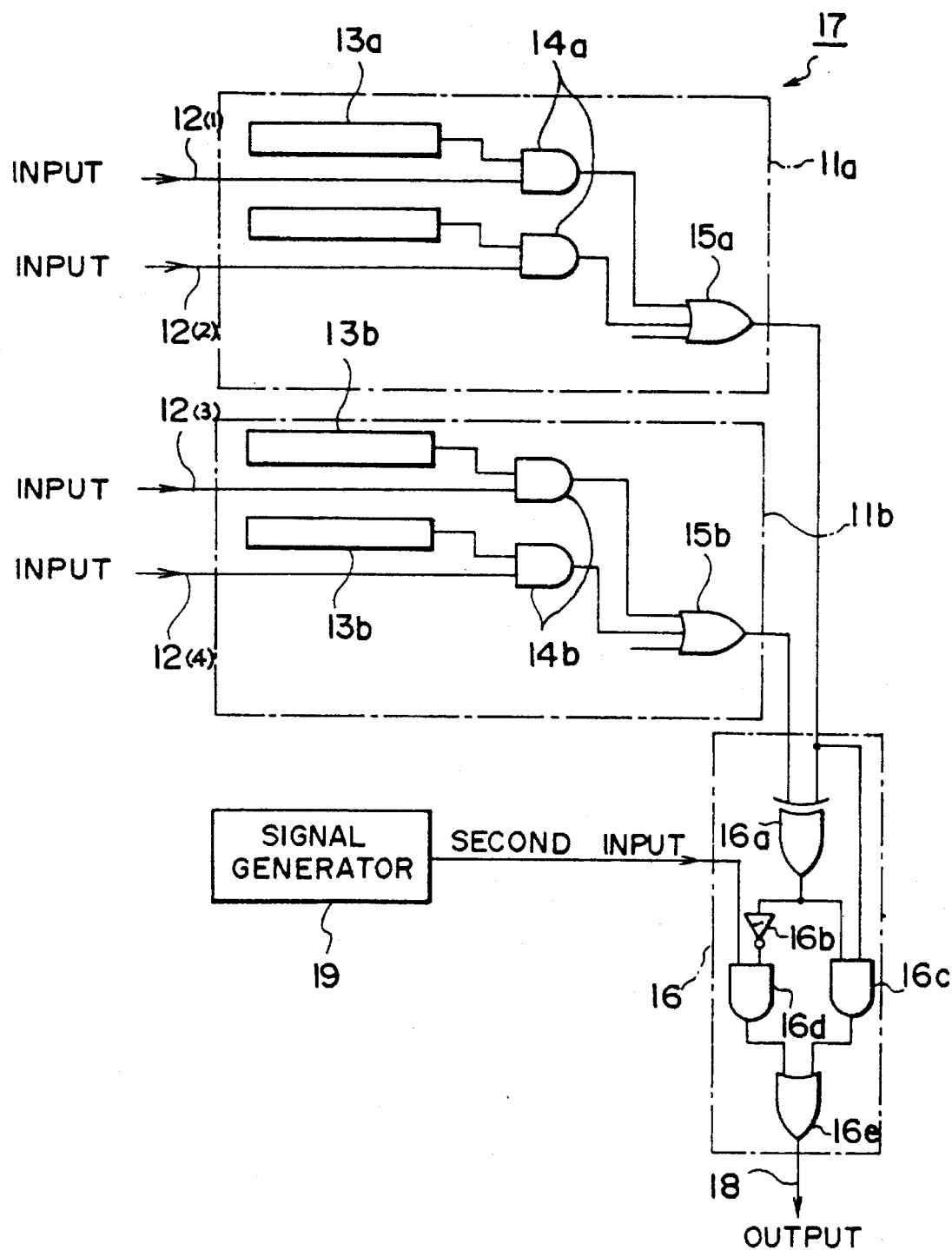
FIG. 8 is a circuit diagram illustrating a neuron unit according to a first embodiment of the present invention.

Referring to FIG. 8, which shows an essential part of a neuron unit, a neuron unit 17 has an excitation group 11a, an inhibition group 11b and a gate circuit 16. Input lines 12(1) and 12(2) are respectively connected to the excitation group 11a, and input lines 12(3) and 12(4) are respectively connected to the inhibition group 11b. The excitation group 11a has storage devices 13a, AND gates 14a and an OR gate 15a. Each of the storage devices 13a stores a weighting coefficient $T_{ij}$ which corresponds to the excitation coupling condition and is formed of a binary bit sequence. Each of input lines 12(1) and 12(2) and each of the storage devices 13a are respectively connected to a corresponding one of the AND gates 14a. Logical product signals from the AND gates 14a are respectively input to the OR gate 15a. The inhibition group 11b has storage devices 13b, AND gates 14b and an OR gate 15b. The input lines 12(3) and 12(4), the storage devices 13b, the AND gates 14b and the OR gate 15b are connected to each other in the same manner as corresponding parts of the excitation group 11a. Each of the storage devices 13b in the inhibition group 11b stores a weighting coefficient $T_{ij}$ which corresponds to the inhibitory coupling condition and is formed of a binary bit sequence.

A logical sum signal output from the OR gate 15a is supplied, as a first response signal, to the gate circuit 16, and a logical sum signal output from the OR gate 15b is also supplied, as a second response signal, to the gate circuit 16. The gate circuit 16 has an Exclusive-OR gate 16a, an inverter 16b, AND gates 16c and 16d and an OR gate 16e. The first and second response signals from the OR gates 15a and 15b are respectively input to the Exclusive-OR gate 16a. An output signal of the Exclusive-OR gate 16a and the first response signal from the OR gate 15a in the excitation group 11a are respectively input to the AND gate 16c. The output signal of the Exclusive-OR gate 16a which passes through the inverter 16b, and a second input signal supplied from a signal generator 19 are input to the AND gate 16d. The AND gates 16c and 16d are respectively connected to the OR gate 16e. A logical sum signal from the OR gate 16e is supplied, as the output signal of the neuron unit 17, to the output line 18.

Figure 9:
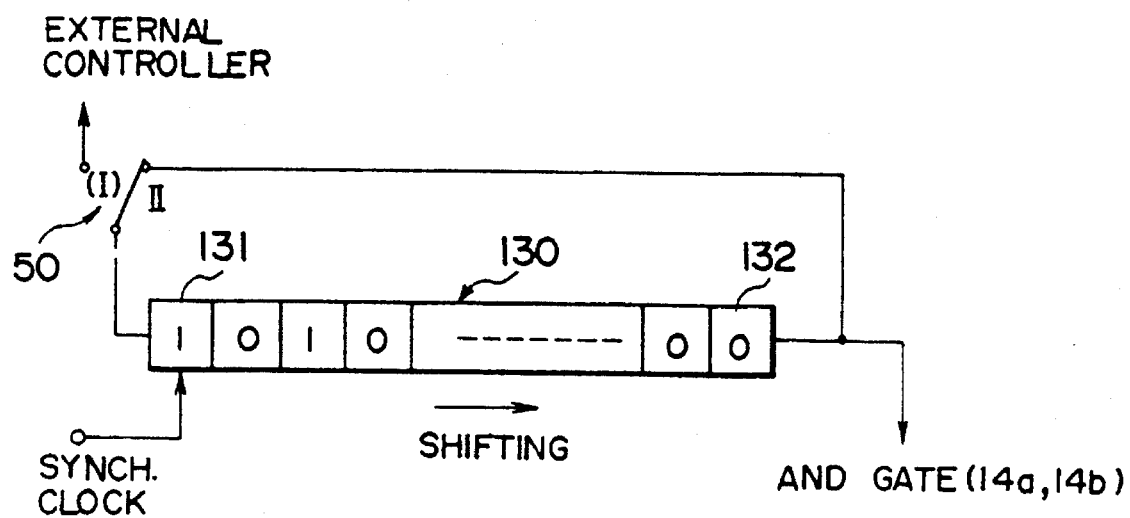
FIGS. 9, 10 and 11 are block diagrams illustrating examples of a storage device shown in FIG. 8.

Each of the storage devices 13a and 13b is formed, for example, as shown in FIG. 9.

FIG. 9 shows a first example of the storage devices 13a and 13b. In this example, each of the storage devices is formed of a shift register 130. The shift register 130 has n bit stages (n is, for example, equal to 128). A first bit stage 131 of the shift register 130 is connected to a common terminal of a switch 50. A first terminal (I) of the switch 50 is coupled to an external controller (not shown), and a second terminal (II) of the switch 50 is connected to an n-th bit stage 132 of the shift register 130. The n-th bit stage 132 is further connected to the AND gate 14a or 14b. The shift register 130 shifts the binary bit sequence forming the weighting coefficient in synchronism with a synchronizing clock signal by one bit.

In a state where the switch 50 selects the first terminal (I), the binary bit sequence corresponding to the weighting coefficient is supplied from the external controller via the switch 50 to the first bit stage 131 of the shift register 130. The shift resister 130 shifts the binary bit sequence in synchronism with the synchronizing clock signal by one bit, so that the binary bit sequence corresponding to the weighting coefficient is stored in the shift register 130. After this, the switch 50 selects the second terminal (II). Then, the bit sequence is shifted in the shift register 130 in synchronism with the synchronizing clock signal so that the binary bit sequence is supplied from the n-th bit stage 132 to the AND gate 14a or 14b in synchronism with the synchronizing clock signal. In this case, each bit of the binary bit sequence is successively fed back from the n-th bit stage 132 of the shift register 130 via the switch 50 to the first bit stage 131 thereof so that the binary bit sequence forming the weighting coefficient is recursively shifted in the shift register 130.

The weighting coefficient $T_{ij}$ which is output, as a pulse sequence corresponding to the binary bit sequence, from the shift register 130 and the input pulse signal $y_i$ are input to each of the corresponding AND gates 14a and 14b in synchronism with the synchronizing clock signal, so that the logical product of the input signal and the weighting coefficient is output from each of the AND gates 14a and 14b. That is, a logical operation as shown in FIGS. 6A, 6B and 6C is performed by each of the AND gates 14a and 14b. In the excitation group 11a, the first response signal which is a logical sum of the logical products output from the AND gates is obtained by the OR gate 15a. In the inhibition group 11b, the second response signal which is a logical sum of the logical products output from the AND gates 14b is obtained by the OR gate 15b. That is, in both the excitation group 11a and the inhibition group 11b, a logical operation as shown in FIGS. 7A and 7B is performed by each of the corresponding OR gates 15a and 15b. The first response signal which is output from the excitation group 11a and the second response output signal which is output from the inhibition group 11b are supplied to the gate circuit 16. When the value of the first response signal differs from the value of the second binary output signal, the output of the Exclusive-OR 16a has an active value "1" and thus the AND gate 16b is active and the AND gate 16c is inactive. Thus, the first response signal output from the excitation group 11a is output, as the output signal of the neuron unit, from the gate circuit 16 to the output line 18. For example, in a case where the value of the first response signal output from the excitation group 11a is "0" (a low level) and that of the second response signal output from the inhibition group 11b is "1" (a high level), the neuron unit 17 outputs "0", that is the output signal has a low level. In a case where the value of the first response signal is "1" and that of the second response signal is "0", the neuron unit 17 outputs "1", that is the output signal has a high level. On the other hand, when the value of the first response signal is equal to the value of the second binary output signal, the output of the Exclusive-OR gate 16a has an inactive value "0" and thus the AND gate 16b is inactive and the AND gate 16c is active. Thus, the second input signal supplied from the signal generator 19 is output, as the output signal of the neuron unit 17, from the gate circuit 16 to the output line 18.

In the above case, the neuron unit 17 outputs the output signal $y_o$ in accordance with the following truth table.

| TRUTH TABLE | | |
| --- | --- | --- |
| excitation (1st response) | inhibition (2nd response) | output $y_o$ |
| 1 | 0 | 1 |
| 0 | 1 | 0 |
| 1 | 1 | * |
| 0 | 0 | * |

In a case where the number of "1"s in the binary bit sequence corresponding to the output signal $y_o$ of the neuron unit 17 is large, that is, the pulse density of the output signal $y_o$ is high, an effect of the excitation coupling with respect to the neuron unit 17 is greater than that of the inhibition coupling with respect to the neuron unit 17. On the other hand, in a case where the number of "1"s in the binary bit sequence corresponding to the output signal $y_o$ of the neuron unit 17 is small, that is, the pulse density of the output signal $y_o$ is low, the effect of the inhibition coupling with respect to the neuron unit 17 is greater than that of the excitation coupling with respect to the neuron unit 17. When the value of the second binary input signal output from the signal generator 19 is always "1" (a high level), * in the above truth table is "1". In this case, the effect of the excitatory coupling with respect to the neuron unit is emphasized. When the value of the second binary input signal output from the signal generator 19 is always "0" (a low level), * in the above truth table is "0". In this case, the effect of the inhibitory coupling with respect to the neuron unit 17 is emphasized. When the second binary input signal has the pulse density of 0.5, * in the above truth table can be "0" and "1" at the same probability. In this case, the output signal $y_o$ can have a reasonable value (the pulse density). The pulse density of the second input signal supplied to the gate circuit 16 is set at a predetermined value based on a process which is performed by a neural network including this neuron unit 17. It is preferable, in general, that the pulse density of the second input signal supplied to the gate circuit 16 be equal to 0.5.

Figure 10:
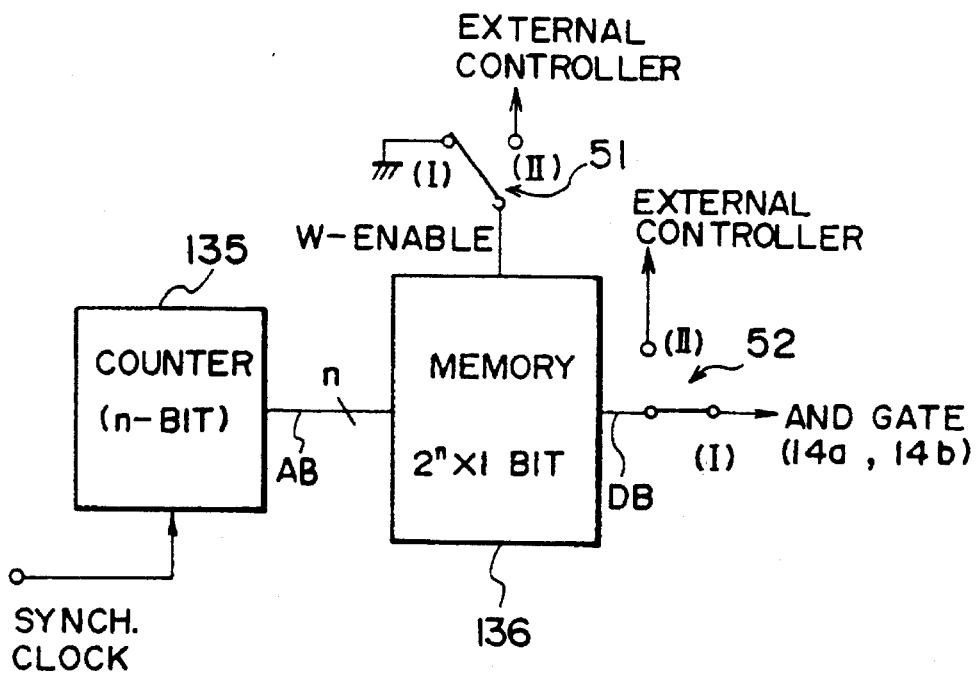

FIG. 10 shows a second example of the storage devices 13a and 13b. In the second example, each of the storage devices 13a and 13b is formed of a counter and a memory.

Referring to FIG. 10, a counter 135 has n-bit outputs and increments one by one in synchronism with the synchronizing clock signal. A memory 136 is formed, for example, of a $2^n \times 1$ bit RAM or ROM. The n outputs of the counter 135 are connected to an address bus (AB) of the memory 136. A data bus (DB) of the memory 136, which has one bit, is connected to one of the AND gates 14a and 14b. The binary bit sequence corresponding to the weighting coefficient is stored in the memory 136 so that each bit of the binary bit sequence is stored at one of a plurality of addresses (for example, 0 to $2^{n-1}$) in the memory 136. When the counter 135 increments in synchronism with the synchronizing clock signal, the memory 136 outputs the binary bit sequence corresponding to the weighting coefficient by one bit. Thus, the pulse sequence corresponding to the weighting coefficient is supplied via the data bus (DB) to one of the AND gates 14a and 14b. In a case where the memory 136 is formed of the ROM, the weighting coefficient is previously stored in the memory 136. In a case where the memory 136 is formed of the RAM, the weighting coefficient stored in the memory 136 can be rewritten. When the weighting coefficient is rewritten, switches 51 and 52 select a second terminal (II). Then, a new weighting coefficient is supplied from the external controller to the memory 136 via the switch 52 and the data bus (DB), and in addition a write-enable signal is also supplied from the external controller to the memory 136 via the switch 51.

Figure 11:
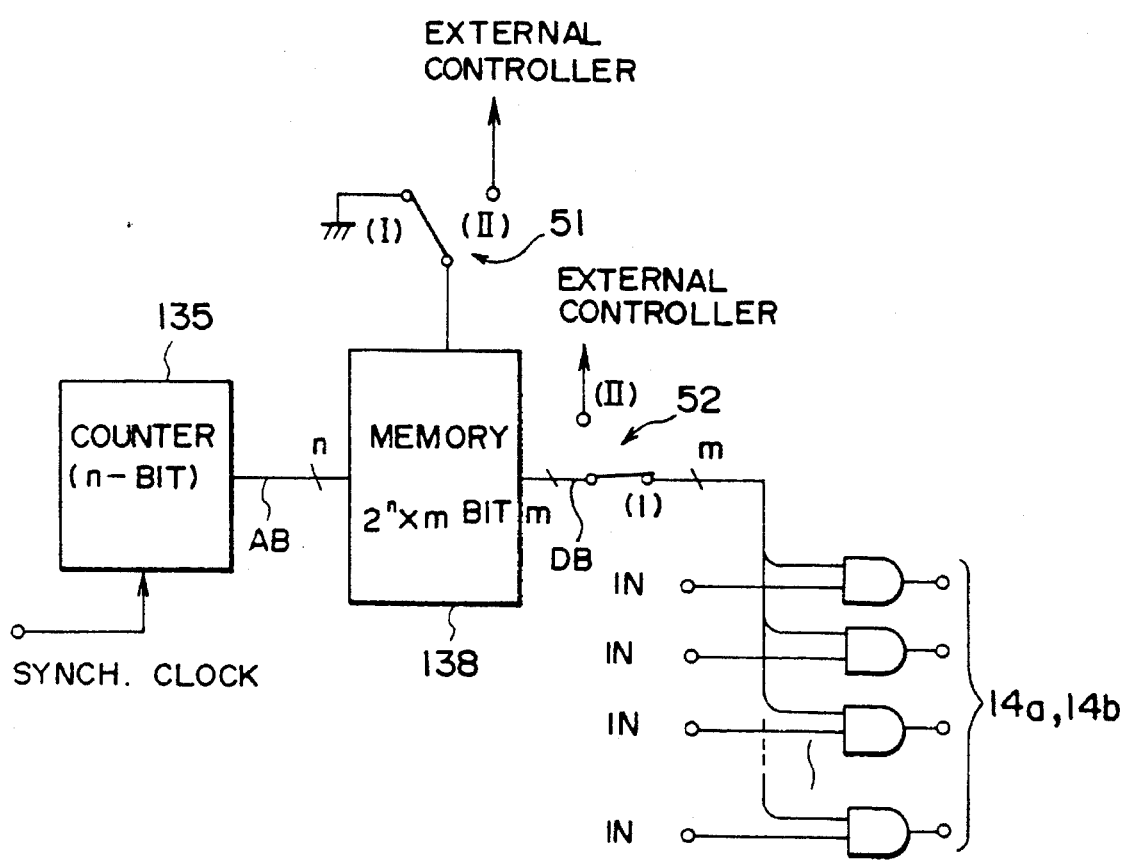

FIG. 11 shows a third example of the storage devices 13a and 13b. In the third example, a $2^n \times m$-bit memory is used in place of the $2^n \times 1$-bit memory shown in FIG. 10. In FIG. 11, those parts which are the same as those shown in FIG. 10 are given the same reference numbers.

Referring to FIG. 11, a memory 138 is formed, for example, of a $2^n \times m$ bit ROM or RAM. That is, m-bit data can be stored at each address in the memory 138. Each line in the data bus (DB) of the memory 138 is connected to a corresponding one of the AND gates 14a and 14b. The memory 138 can store m weighting coefficients. When the counter 135 increments in synchronism with the synchronizing clock signal, a pulse sequence corresponding to each of the weighting coefficients is output from the memory 138 via a corresponding one of the lines in the data bus (DB).

A description will now be given of a second embodiment of the present invention with reference to FIG. 12. In the second embodiment, the neuron unit has a memory in which data describing whether an input line corresponds to the excitatory coupling or the inhibitory coupling is stored.

Figure 12:
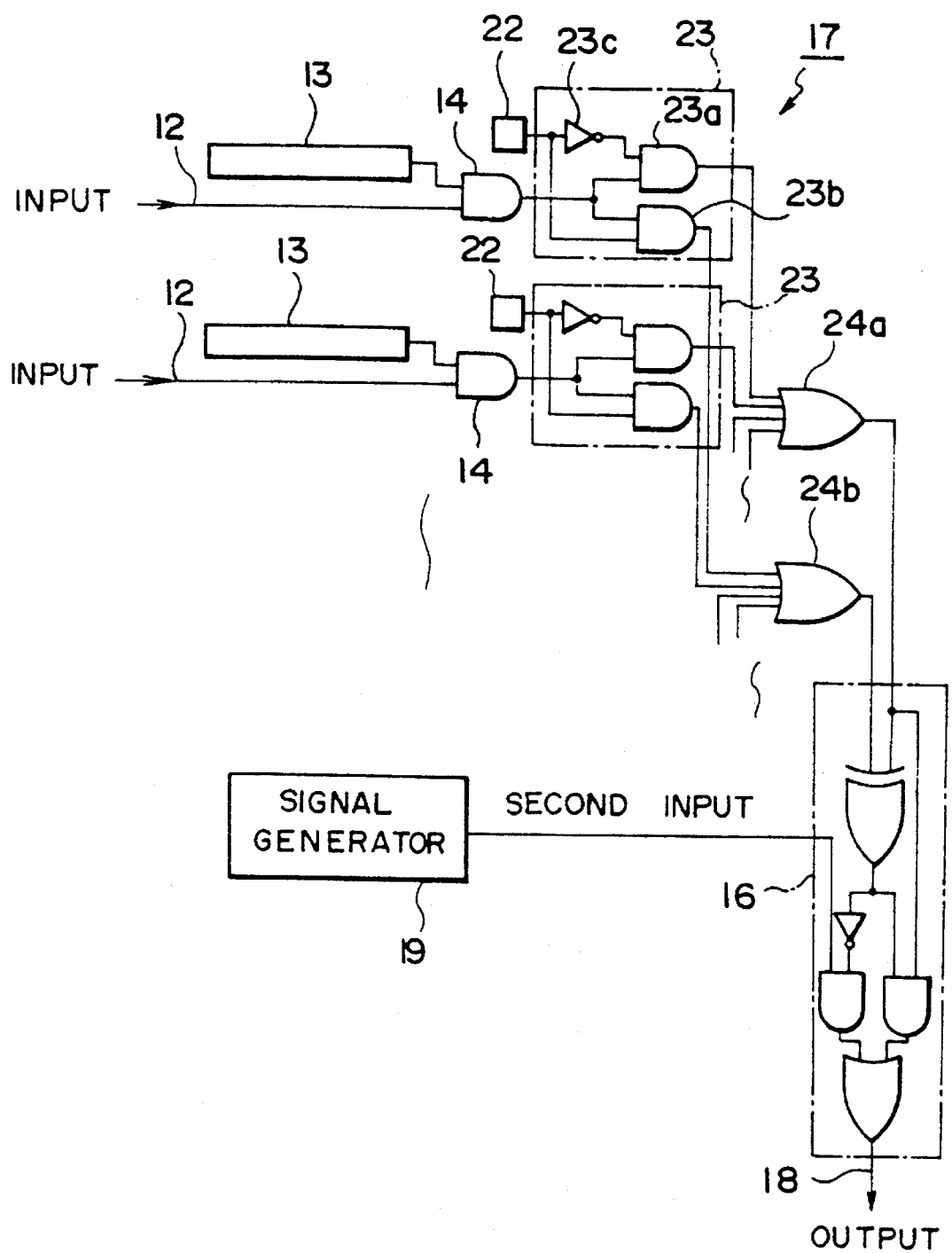
FIG. 12 is a circuit diagram illustrating a neuron unit according to a second embodiment of the present invention.

Referring to FIG. 12, the neuron unit 17 has a plurality of input lines 12. Storage devices 13 each having a weighting coefficient stored therein are provided in the neuron unit 17 so as to respectively correspond to the input lines 12. An input signal supplied via each of the input lines 12 and the weighting coefficient from each of the corresponding storage devices 13 are respectively input to corresponding AND gates 14. State storage devices 22 are also provided in the neuron unit 17 so as to respectively correspond to the input lines 12. The state storage devices 22 can be each formed of a memory, a register and the like. State data is stored in each of the state storage devices 22. The state data describes whether a corresponding input line is coupled to another neuron unit in the excitatory coupling state or the inhibitory coupling state. A logical product signal from each of the AND gates 14 and the state data which is read out from each of the state storage devices 22 in synchronism with the logical product signal are supplied to corresponding gate circuits 23. Each of the gate circuits 23 has a first AND gate 23a, a second AND gate 23b and an inverter 23c. The state data is supplied from each of the state storage devices 22 via the corresponding inverters 23c to the corresponding first AND gates 23a and directly to the corresponding second AND gates 23b. The logical product signal from each of the AND gates 14 is supplied to the corresponding first and second AND gates 23a and 23b. An output of the first AND gate 23a in the gate circuit 23 is connected to an input of an OR gate 24a. An output of the second AND gate 23b in each of the gate circuits 23 is connected to an input of an OR gate 24b. The outputs of the OR gates 24a and 24b are respectively connected to the gate circuit 16. The gate circuit 16 has the same structure as that shown in FIG. 8, and the second input signal is supplied from the signal generator 19 to the gate circuit 16 in the same manner as that shown in FIG. 8.

The state data representing the excitatory coupling is, for example, "0", and the state data representing the inhibitory coupling is, for example, "1". In a case where the state data "0" representing the excitatory coupling is stored in each of the state storage devices 22, each of the first AND gates 23a is active and each of the second AND gates 23b is inactive. In this case, the output signal of each of the second AND gates 23b is maintained at "0", and the logical product signal output from each of the AND gates 14 is supplied via the corresponding first AND gates 23a to the OR gate 24a. Thus, the OR gate 24a outputs a logical sum of the logical products which are obtained by use of weighting coefficients and input signals in the input lines corresponding to the excitatory coupling. That is, the OR gate 24a outputs the first response signal. In a case where the state data "1" representing the inhibitory coupling is stored in each of the state storage devices 22, each of the first AND gates 23a is inactive and each of the second AND gates 23b is active. In this case, the output signal of each of the first AND gates 23a is maintained at "0", and the logical product signal output from each of the AND gates 14 is supplied via the corresponding second AND gates 23b to the OR gate 24b. Thus, the OR gate 24b outputs a logical sum of the logical products which are obtained by use of weighting coefficients and input signals in the input lines corresponding to the inhibitory coupling. That is, the OR gate 24b outputs the second response signal. The gate circuit 16 carries out the same logical operate as that shown in FIG. 8.

Each of the storage devices 13 can be formed of the shift register 130 shown in FIG. 9 and the memories 136 and 138 shown in FIGS. 10 and 11, respectively.

A description will now be given of a third embodiment of the present invention with reference to FIG. 13.

Figure 13:
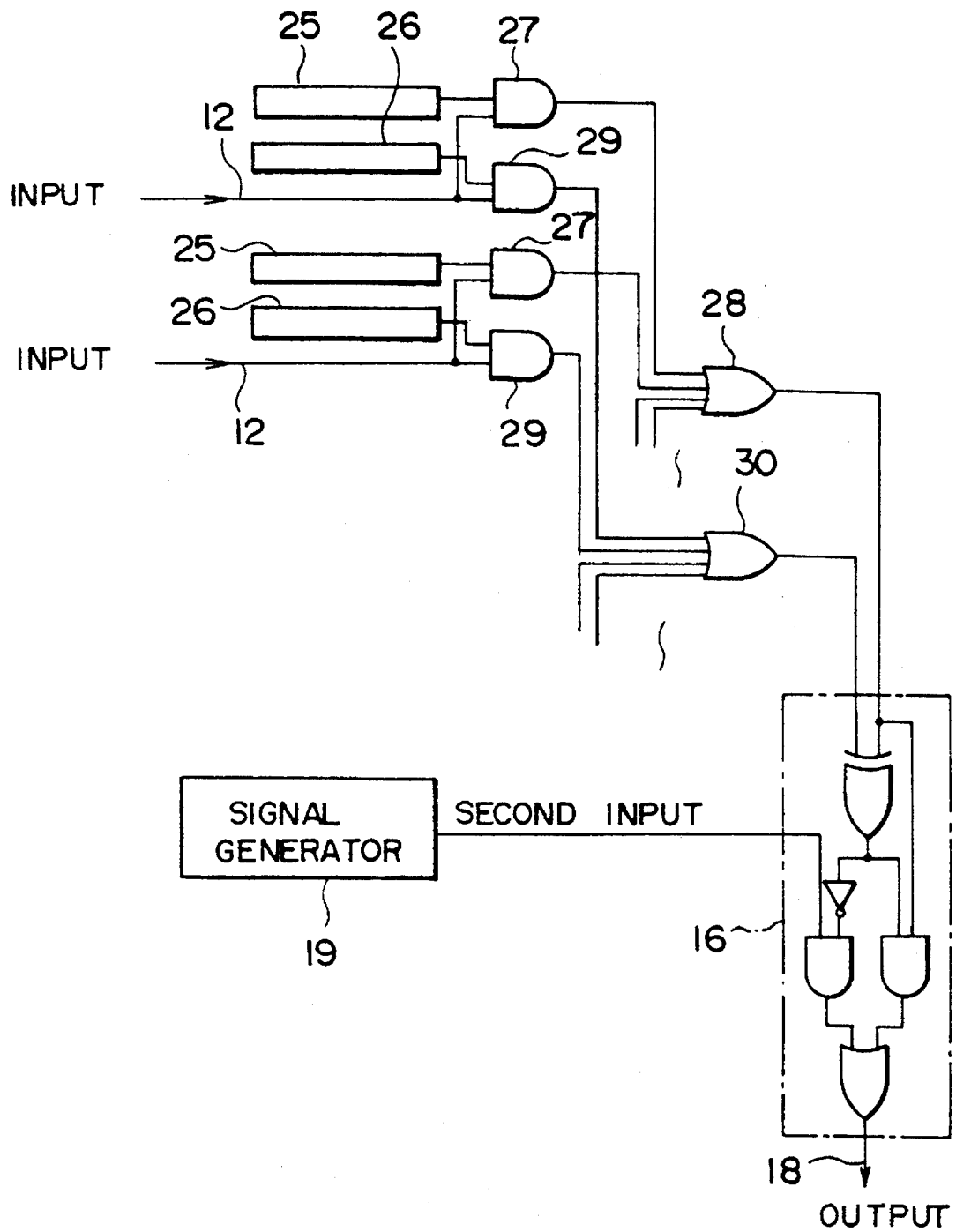
FIG. 13 is a circuit diagram illustrating a neuron unit according to a third embodiment of the present invention.

Referring to FIG. 13, a neuron unit 17 has a plurality of input lines 12. First storage devices 25 and second storage devices 26 are provided in the neuron unit 17 so as to correspond to each of the input lines 12. Each of the first storage devices 25 stores a weighting coefficient representing the excitatory coupling. Each of the second storage devices 26 stores a weighting coefficient representing the inhibitory coupling. An input signal in each of the input lines 12 is supplied to AND gates 27 and 29. The weighting coefficient representing the excitatory coupling is supplied from each of the first storage devices 25 to the corresponding AND gates 27. The weighting coefficient representing the inhibitory coupling is supplied from each of the second storage devices 25 to the corresponding AND gates 29. A logical product signal from each of the AND gates 27 is input to an OR gate 28. A logical product signal from each of the AND gates 29 is input to an OR gate 30. The outputs of the OR gates 28 and 30 are respectively connected to the gate circuit 16. The gate circuit 16 has the same structure as that shown in FIGS. 8 and 12, and the second input signal is supplied from the signal generator 19 to the gate circuit 16 in the same manner as that shown in FIGS. 8 and 12.

In the third embodiment, a weighting coefficient with respect to each of the input lines 12 is divided into a first weighting coefficient (positive) representing the excitatory coupling and a second weighting coefficient (negative) representing the inhibitory coupling. Thus, the OR gate 28 outputs the first response signal which is a logical sum of the logical products which are obtained by use of weighting coefficients representing the excitatory coupling and input signals. The OR gate 30 outputs the second response signal which is a logical sum of the logical products which are obtained by use of weighting coefficients representing the inhibitory coupling and input signals. The gate circuit 16 carries out the same logical operation as that shown in FIGS. 8 and 12.

Figure 14:
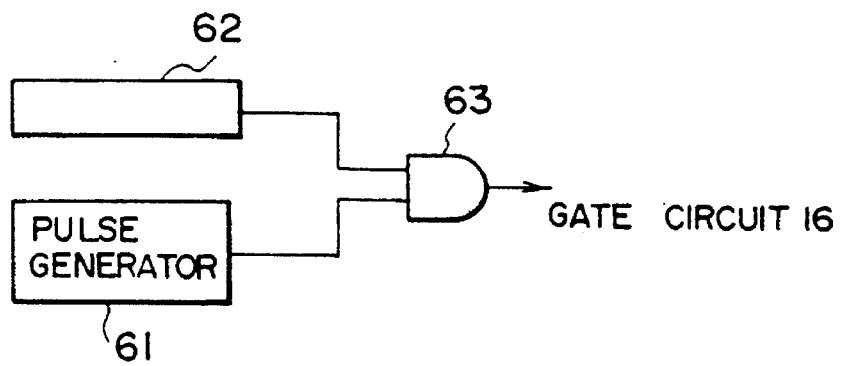
FIG. 14 is a circuit diagram illustrating a signal generator shown in FIGS. 8, 12 and 13.

FIG. 14 shows a modification of the signal generator 19 shown in FIGS. 8, 12 and 13.

Referring to FIG. 14, the signal generator 19 has a pulse generator 61, a storage device 62 and an AND gate 63. The pulse generator 61 outputs a pulse signal having a predetermined pulse density (i.e. 0.5). The storage device 62 can be formed of the shift register 130 shown in FIG. 9 and the memories 136 and 138 shown in FIGS. 10 and 11, respectively. A binary bit sequence corresponding to a coefficient is stored in the storage device 62. The pulse signal output from the pulse generator 61 and a pulse signal corresponding to a coefficient output from the storage device 62 are input to the AND gate 63. A logical product signal from the AND gate 63 is supplied, as the second input signal, to the gate circuit 16. In this modification, when the coefficient stored in the storage device 62 is changed to a new one, the pulse density of the second input signal supplied to the gate circuit 16 is changed to a value corresponding to the new coefficient. Thus, the neuron unit 17 can be more widely used.

The neuron unit 17 described above is modeled on one nervous cell in a living human body. However, in actual practice, a neural network is formed of a plurality of the neuron units 17. For example, the neuron units 17 form a hierarchical network structure (having three layers) shown in FIG. 15 in which an output of one of the neuron unit 17 in a layer is coupled to an input line of one of the neuron unit 17 provided in a next layer or the same layer. When the network as a whole is synchronized, the same above described function may be utilized successively to carry out calculations.

The input data generally has an analog value in most cases. Hence, when converting the input data into a pulse sequence, a random number is generated from a random number generator, and the generated random number is compared with the analog value of the input data. A desired pulse sequence corresponding to the input data is obtained by generating a value "1" or "0" depending on whether the analog value is smaller than the random number. The output is also in the form of a pulse sequence, but a pulse density corresponding thereto can be obtained by use of a counter or the like. Of course, the output may be output as it is in the form of the pulse sequence where preferable.

A method of describing a signal by use of the pulse density is effective not only in actual circuits but also when simulating the circuit operation on the computer. In other words, the operations on the computer are carried out serially, but compared to the calculation of analog values, it is only possible to considerably improve the calculation speed because only logic operations need to be carried out on binary values "1" and "0". Generally, the operations on the four fundamental rules of arithmetics require a large number of machine cycles per calculation, but a logic operation requires only a small number of machine cycles. In addition, there is an additional advantage in that it is easier to use a low-level language for high-speed processing when only logic operations are required.

A description will now be given of an example in which the neural network is formed of the neuron units 17, each of which is shown in FIG. 12.

Figure 15:
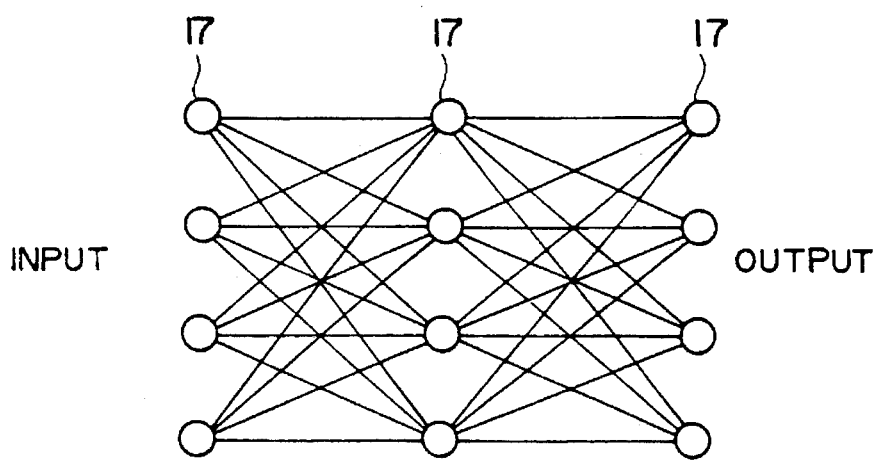
FIG. 15 is a diagram illustrating a neural network including a plurality of neuron units.

In this case, 128-bit shift registers are used for the storage devices 13*a* and 13*b*. The binary bit sequence in each of the shift register is used recursively. A neural network formed of the neuron units has three layers, as shown in FIG. 15. A first layer of the neural network has 256 neuron units 17, a second layer thereof has 20 neuron units 17, and a third layer thereof has 5 neuron units 17. In this 3-layer structure, all inputs and outputs of the neuron units 17 are coupled between the first and second layers and between the second and third layers.

Figure 16:
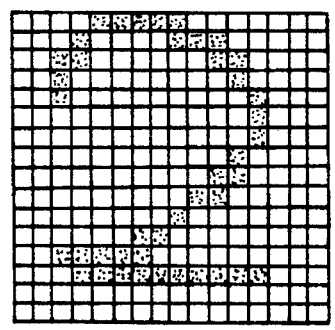
FIG. 16 is a diagram illustrating an example of a character which is recognized by a character recognition system formed on the neural network.

The above described neural network was used, for example, for making a character recognition responsive to a handwritten character input. In this case, each of the weighting coefficients (content of each of the shift registers 13) is obtained by a computer simulation in the following manner. First, a character shown in FIG. 16 is read by a scanner, and the read image is sectioned into 16×16 mesh parts. Each mesh part including a portion of the character is described by a value "1". Each mesh part not including a portion of the character is described by a value "0". 256 data are input to the 256 neuron units 17 in the first layer of the neural network. Each of the 5 neuron units 17 in the third layer of the neural network corresponds to one of characters "1" through "5". When the numbers "1" through "5" are input, learning takes place so that the neuron unit 17 corresponding to one of the input numbers outputs "1" and all the other neuron units 17 output "0". The weighting coefficients obtained by the above learning are stored in the corresponding shift registers 13. There is a weighting coefficient representing the excitatory coupling and a weighting coefficient representing the inhibitory coupling. To distinguish the excitatory coupling and the inhibitory coupling from each other, state data describing either the excitatory coupling or the inhibitory coupling is stored in the corresponding storage device 22. The above learning is carried out in accordance with the Back-Propagation method of Rumelhart. As the input is "0" or "1" in this case, the input pulse sequence has a monotonous low level or a monotonous high level. The signal generator 19 supplies the second input signal having a pulse density of 0.5 to the gate circuit 16. The output of each of the neuron units 17 in the third layer is coupled to a light emitting diode (LED) via a transistor, so that the LED turns OFF in response to a low-level output "0" from each of the neuron units 17 and turns ON in response to a high-level output "1" therefrom. The frequency of the synchronizing clock signal is set to 1000 kHz, so that the brightness of the LED changes depending on the pulse density. To the human eye, the brightest LED corresponds to the recognition result. The neural network was used to recognize the characters which were sufficiently taught to the character recognition system on the computer simulation, and it was found that the recognition result obtained from the neural network was the same as the recognition result obtained by the computer simulation.

Some parts of the neuron unit according to the present invention can be formed of either software or logic circuits which carry out the operation in accordance with a negative logic. Further, the present invention is not limited to the aforementioned embodiments, and variations and modifications may be made without departing from the scope of the claimed invention.

What is claimed is:

1. A digital neuron unit comprising;
   a plurality of first logical circuits, each of which performs a logical calculation on an input binary signal using a weighting coefficient, said plurality of first logical circuits being classified into a first group and a second group;
   a second logical circuit, coupled to said first group of said plurality of first logical circuits, for performing a logical calculation on output signals from first logical circuits belonging to said first group and for outputting a first binary response signal as a result of the logical calculation;
   a third logical circuit, coupled to said second group of said plurality of first logical circuits, for performing a logical calculation on output signals from the first logical circuits belonging to said second group and outputting a second binary response signal as a result of the logical calculation;
   a digital signal generator providing, at an output port thereof, a binary signal; and
   a fourth logical circuit, coupled to said second logical circuit, said third logical circuit and said digital signal generator, for inputting said first and second binary response signals and said binary signal from said digital signal generator, and for providing at an output port thereof, a neuron output signal such that, when said first and second binary response signals differ from each other, said neuron output signal is said first binary response signal, and when said first and second binary response signals are equal to each other, said neuron output signal is said binary signal from said digital signal generator.

2. The digital neuron unit as claimed in claim 1, wherein an active state of said first binary response signal represents an excitation state and an active state of said second binary response signal represents an inhibition state.

3. The digital neuron unit as claimed in claim 2, wherein said binary signal generated by said digital signal generator represents a medium state which is a state between the excitation state and the inhibition state.

4. The digital neuron unit as claimed in claim 1, wherein said digital signal generator comprises:
   a pulse generator for providing, at an output port thereof, pulses having a predetermined pulse repetition rate;
   a memory device in which a predetermined binary coefficient signal is stored, said device having a readout port and means for providing said coefficient signal at said readout port; and
   a signal-generation AND gate having a first input port which is connected to said readout port, a second input port which is connected to said output port of said pulse generator, and an output port, connected to said output port of said digital signal generator, which provides a binary signal that is a logical product of said pulses and said coefficient signal, whereby said binary signal output by the output port of said signal-generation AND gate is provided at said output port of said digital signal generator.

* * * * *